Patented July 20, 1926.

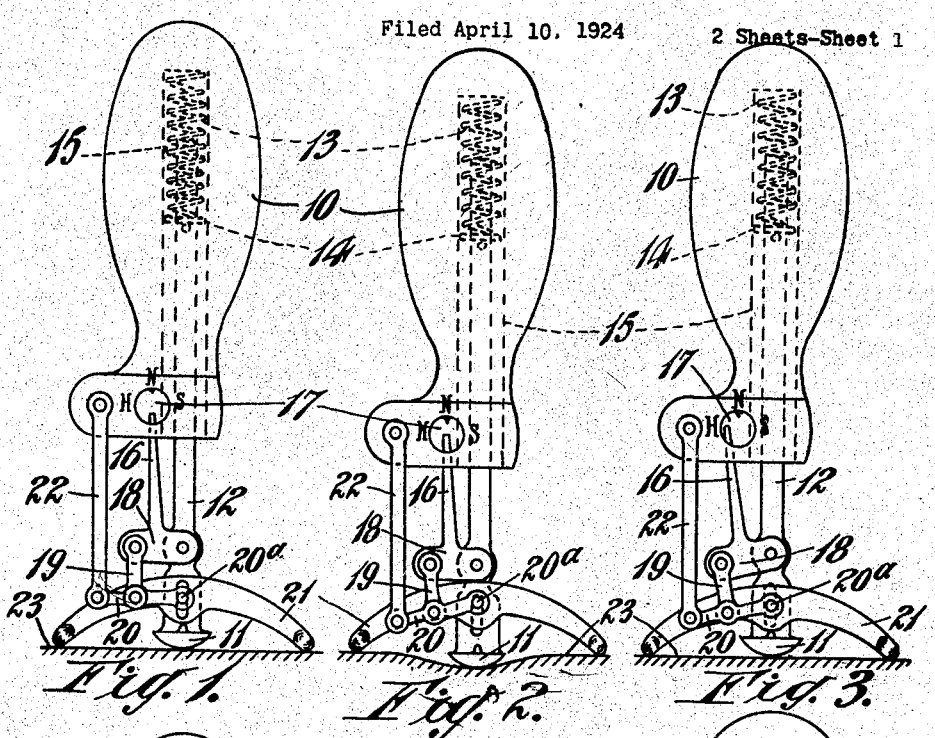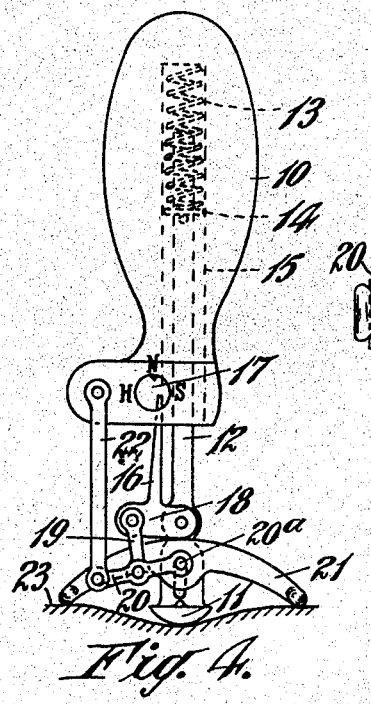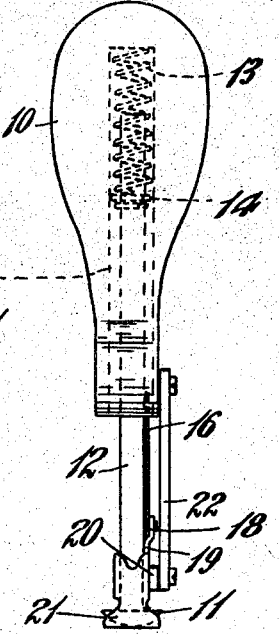

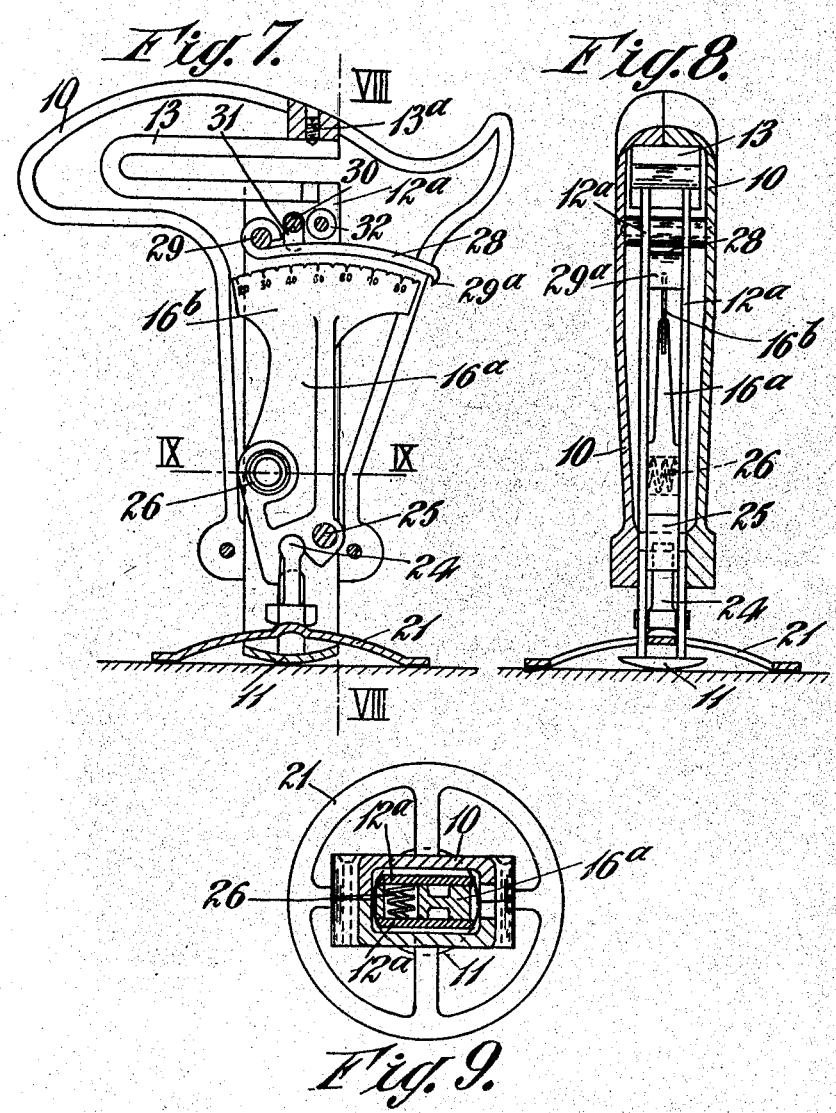

1,593,318

UNITED STATES PATENT OFFICE.

WILLIAM TREWHELLA, OF TRENTHAM, VICTORIA, AUSTRALIA.

TIRE-PRESSURE GAUGE.

Application filed April 10, 1924, Serial No. 705,630, and in Australia May 2, 1923.

The present invention has been devised to provide a simple and cheap device or instrument which can be readily applied to the surface of a pneumatic tire for the purpose of ascertaining the air pressure.

It will be evident that when a depressing force is applied to an inflated tire the depth of the depression in the surface will be dependent upon the applied force and the resistance of the tire as determined by its air pressure.

If the force so applied was known and the depth of the depression measurable it is obvious that with two such known factors the air pressure would be readily calculable by a correctly calibrated mechanism actuated by the relative movement of the force transmitting element reaching into the bottom of the depression, and an element associated therewith, but remaining stationary, at the nondepressed surface of the tire adjacent to the mouth of the depression.

With these considerations in mind the applicant has devised means whereby a force manually applied to the tire and causing same to yield will also occasion yielding movement of a spring or like element, and said means will indicate a relationship between the two yielding elements conveying an indication of the tire pressure.

Broadly stated the indicating means will essentially comprise an element capable of being manually pressed against a spring interposed between said element and a tire depressing element, said spring, when compressed to a predetermined degree by a definite force applied to said manually pressed element, determining the movement of said elements towards the tire and means, controlled by the movement of said elements for indicating the pressure within the tire said means being connected to a tire contact element.

In practice the tire depression element may conveniently project from the manually pressed element and has free movement against a spring housed within the latter.

Practical applications of the invention are depicted in the accompanying drawings in which, Figures 1, 2, 3 and 4 are side elevations of a form of the tire pressure indicator the last three Figures each illustrating a different operative position of the mechanism.

Figure 5 is an elevation at right angles to the side elevation shown in Figs. 1, 2, 3 and 4, Figure 6 is an end elevation partly in section.

Figures 7, 8 and 9 depict a further form of the pressure indicator in accordance with this invention, Figure 7 being a longitudinal sectional elevation, Figure 8 a section of line VIII—VIII in Figure 7 whilst Figure 9 is a section on line IX—IX of Figure 7.

Referring particularly to Figures 1 to 6 inclusive in the construction therein shown the manually depressible element is constituted by the handle 10, the tire depression element by the button 11 attached to rod 12 with the spring 13 interposed between the collar 14 on said rod 12 and the outer end of the spring housing recess 15 in said handle 10. The indicating means consists of the pointer 16 operating over a disc or aperture 17 in the handle 10 and attached to or integral with the lever 18 one end of said lever is pivoted to rod 12 whilst to its other end is pivoted a link 19 connected to the lever 20 pivotally attached by a pin 20ª to the curved tire contact member 21 and also by a link 22 to the handle member 10.

In use, the device is applied in a horizontal position against the side wall 23 of a tire and when a definite degree of manual pressure is applied to the handle 10 compression of the spring 13 is effected to an extent sufficient to cause the button 11 attached to rod 12 to move into the tire surface (see Figures 2 and 4) the degree of said movement of the button under such pressure being determined by the amount of resistance set up by the air pressure within the tire. If the tire pressure is the correct amount the rod 12 and link 22 attached to handle 10 will move to such an extent that the normal position of the pointer 16 will remain constant as in Figure 2.

If however the tire pressure is in excess of the normal amount it will resist depression by the button 11 which latter will consequently remain stationary whereas the relative movement of the handle 10 will so actuate the pointer 16 through link 22, lever 20, link 19 and lever 18 that the pointer will swing to the left in Figure 3 and indicate such excess pressure.

Again if the tire pressure is below the normal pressure the links and levers mentioned will take up the positions shown in Figure 4 and cause movement of the pointer in the opposite direction to that in Figure 3.

Referring now to Figures 7, 8 and 9 in the alternative construction shown in such Figures the form of the handle 10 is varied and the spring 13 is U-shaped, one end being secured to the handle by a grub screw 13$^a$ whilst the other is secured between a parallel pair of check plates 12$^a$ which are equivalent to the previously described rod 12, the lower ends of said plates carrying the tire depression button 11.

The equivalent of the pointer in this construction consists of a lever 16$^a$ having a graduated segment at its free end 16$^b$ whilst its other end bears on a fulcrum at the end of a pin 24 which is loosely supported upon the circular tire contact member 21 as shown. The lever 16$^a$ is pivotally secured by a pin 25 to the check plates 12$^a$. A light coil spring 26 may be inserted between the check plates 12$^a$ to prevent undue freedom of movement of same within the casing forming the handle 10.

Housed within said casing, between the spring 13 and the free end 16$^b$ of said lever 16$^a$, is a spring detent 28 secured by a pin 29 to said check plates 12$^a$. Said detent 28 terminates at its free end in an inturned point 29$^a$ adapted to engage with graduated notches in said segmental end 16$^b$. To actuate said detent into engagement with said notches a pin 30 is provided on the casing of the handle 10 which pin passes through a slot 31 in said check plates 12$^a$, and when the handle is depressed towards the tire, engages with said detent and causes movement towards the segmental end 16$^b$ of said lever 16$^a$. A stop 32 may be provided on the check plates 12$^a$ to restrict the outward movement of the detent 28.

In use the construction described with reference to Figures 7, 8 and 9 functions similarly to that illustrated in the previous Figures the lever 16$^a$ however being free to move and set up an indication of air pressure within the range for which the device is designed and as said lever moves outwardly from within the handle the movement of the latter towards said lever causes the pin 30 to actuate the detent 28 and cause locking engagement of same with one of the notches in the free end 16$^b$ of said lever. By this means the parts are retained in the pressure indication position and the device can be removed from tire contact and a reading taken of the pressure whereas in the construction shown in the previous Figures it is necessary to read the pressure indication whilst the device is applied to a tire.

The spring 13 is of such a strength and the leverages so arranged that the required co-action is obtained this being determined by experiment which can with the constructions illustrated be readily performed as the spring can conveniently be removed and another substituted and the pivotal centres of the levers varied. Once such experiments have determined the required arrangement the construction can be standardized.

I claim:—

1. An air pressure indicator for pneumatic tires comprising a manually depressible handle forming a housing, a spring in said housing, a tire depression member, said spring acting against the handle and the said member, a pivoted lever on said member, a tire contact member having a pin on which said lever is fulcrumed, a graduated notched sector on said lever and a detent engaging with said sector, said handle having a pin to actuate said detent.

2. An air pressure indicator for pneumatic tires comprising a manually depressible handle member formed of two counterpart portions, a U-shaped spring enclosed by said portions, a pair of parallel plates, a tire depression button carried by said plates, the said spring acting between handle member and said pair of plates, and a lever pivoted to said pair of plates, a tire contact member, a pin bearing loosely thereon and on which said lever is fulcrumed, a detent, and a graduated sector on said lever engaged by said detent, said handle having a pin by which said detent is actuated.

Dated this 27th day of February 1924.

WILLIAM TREWHELLA.